US008284417B2

(12) United States Patent
Kondo et al.

(10) Patent No.: US 8,284,417 B2
(45) Date of Patent: Oct. 9, 2012

(54) IMAGE PROCESSING DEVICE CAPABLE OF PREVENTING NEEDLESS PRINTING

(75) Inventors: Masaki Kondo, Toyoake (JP);
Tomohiko Hasegawa, Nagoya (JP)

(73) Assignee: Brother Kogyo Kabushiki Kaisha, Aichi-Ken (JP)

(*) Notice: Subject to any disclaimer, the term of this patent is extended or adjusted under 35 U.S.C. 154(b) by 929 days.

(21) Appl. No.: 12/202,986

(22) Filed: Sep. 2, 2008

(65) Prior Publication Data

US 2009/0059257 A1 Mar. 5, 2009

(30) Foreign Application Priority Data

Aug. 31, 2007 (JP) ................ 2007-226090

(51) Int. Cl.
*G06K 15/00* (2006.01)
*G06K 9/40* (2006.01)
*G06K 9/38* (2006.01)
*G03F 3/08* (2006.01)
*H04N 1/04* (2006.01)
*H04N 1/60* (2006.01)

(52) U.S. Cl. ........ 358/1.14; 358/520; 358/488; 358/1.9; 382/274; 382/272

(58) Field of Classification Search .............. 358/1.9, 358/1.14, 520, 518, 530, 540, 488, 537, 538; 382/162, 167, 270, 272, 274
See application file for complete search history.

(56) References Cited

U.S. PATENT DOCUMENTS

| 5,023,708 | A | | 6/1991 | Maruyama et al. | |
|---|---|---|---|---|---|
| 5,210,600 | A | * | 5/1993 | Hirata | ............... 358/527 |
| 5,459,589 | A | | 10/1995 | Ohnishi et al. | |
| 5,539,426 | A | | 7/1996 | Nishikawa et al. | |
| 5,680,230 | A | | 10/1997 | Kaburagi et al. | |
| 5,734,802 | A | | 3/1998 | Maltz et al. | |
| 5,764,380 | A | * | 6/1998 | Noguchi | ............... 358/488 |
| 5,805,308 | A | * | 9/1998 | Tanaka et al. | ............... 358/486 |
| 5,940,530 | A | | 8/1999 | Fukushima et al. | |
| 6,072,914 | A | | 6/2000 | Mikuni | |
| 6,333,752 | B1 | | 12/2001 | Hasegawa et al. | |
| 6,646,760 | B1 | * | 11/2003 | Hanihara | ............... 358/1.9 |
| 6,757,427 | B1 | | 6/2004 | Hongu | |
| 6,801,334 | B1 | | 10/2004 | Enomoto | |
| 6,922,261 | B2 | | 7/2005 | Asano | |

(Continued)

FOREIGN PATENT DOCUMENTS

EP 1 648 158 A1 4/2006

(Continued)

OTHER PUBLICATIONS

Japanese Official Action dated Sep. 8, 2009 with English translation.

(Continued)

*Primary Examiner* — Madelein A Nguyen
(74) *Attorney, Agent, or Firm* — Scully, Scott, Murphy & Presser, P.C.

(57) ABSTRACT

An image processing device includes a first image inputting unit, a second image inputting unit, an image processing unit, and a restriction control unit. The first image inputting that inputs a first image. The second image inputting unit inputs a second image. The image processing unit performs a prescribed process on the second image based on the first image. The restriction control unit is configured to restrict the prescribed process based on information of the first image.

16 Claims, 9 Drawing Sheets

U.S. PATENT DOCUMENTS

| | | | |
|---|---|---|---|
| 7,099,022 B1 | 8/2006 | Kawaoka | |
| 7,145,597 B1* | 12/2006 | Kinjo | 348/222.1 |
| 7,215,792 B2 | 5/2007 | Sharma et al. | |
| 7,283,247 B2* | 10/2007 | Okawa et al. | 356/477 |
| 7,308,155 B2 | 12/2007 | Terada | |
| 7,349,119 B2 | 3/2008 | Tsukioka | |
| 7,508,550 B2 | 3/2009 | Kameyama | |
| 7,729,013 B2 | 6/2010 | Nishida | |
| 7,903,307 B2* | 3/2011 | Dai et al. | 358/540 |
| 2002/0060796 A1 | 5/2002 | Kanno et al. | |
| 2003/0031375 A1* | 2/2003 | Enomoto | 382/255 |
| 2003/0091229 A1 | 5/2003 | Edge et al. | |
| 2003/0128379 A1 | 7/2003 | Inoue | |
| 2003/0193582 A1 | 10/2003 | Kinjo | |
| 2004/0036892 A1* | 2/2004 | Ito et al. | 358/1.2 |
| 2004/0212808 A1* | 10/2004 | Okawa et al. | 356/479 |
| 2005/0152613 A1 | 7/2005 | Okutsu | |
| 2005/0220347 A1 | 10/2005 | Enomoto et al. | |
| 2006/0001928 A1 | 1/2006 | Hayaishi | |
| 2006/0074861 A1 | 4/2006 | Wilensky | |
| 2006/0109529 A1 | 5/2006 | Shimazawa | |
| 2006/0140477 A1 | 6/2006 | Kurumisawa et al. | |
| 2006/0187477 A1* | 8/2006 | Maki et al. | 358/1.9 |
| 2006/0238827 A1 | 10/2006 | Ikeda | |
| 2006/0256410 A1 | 11/2006 | Koie et al. | |
| 2006/0257041 A1 | 11/2006 | Kameyama et al. | |
| 2006/0291017 A1 | 12/2006 | Moran et al. | |
| 2007/0019260 A1 | 1/2007 | Tokie | |
| 2007/0070436 A1 | 3/2007 | Iwaki | |
| 2007/0080973 A1 | 4/2007 | Stauder et al. | |
| 2007/0177029 A1 | 8/2007 | Wada et al. | |
| 2007/0206206 A1 | 9/2007 | Kondo et al. | |
| 2007/0292038 A1 | 12/2007 | Takemoto | |
| 2008/0002216 A1 | 1/2008 | Matsushima | |
| 2008/0239410 A1 | 10/2008 | Hashii et al. | |
| 2009/0128871 A1 | 5/2009 | Patton et al. | |
| 2009/0244564 A1 | 10/2009 | Kondo et al. | |
| 2010/0033745 A1 | 2/2010 | Dai et al. | |

FOREIGN PATENT DOCUMENTS

| | | |
|---|---|---|
| JP | H05-119752 | 5/1993 |
| JP | H05-300531 | 11/1993 |
| JP | 5-342344 A | 12/1993 |
| JP | 6-133329 | 5/1994 |
| JP | 7-177366 A | 7/1995 |
| JP | 7-312720 A | 11/1995 |
| JP | H09-116740 | 5/1997 |
| JP | H09-172553 | 6/1997 |
| JP | H09-284583 | 10/1997 |
| JP | 9-325536 | 12/1997 |
| JP | 10-173947 | 6/1998 |
| JP | H10-149441 | 6/1998 |
| JP | H11-098374 | 4/1999 |
| JP | H11-185034 | 7/1999 |
| JP | H11-196258 | 7/1999 |
| JP | 2000-106623 | 4/2000 |
| JP | 2000-152268 | 5/2000 |
| JP | 2000-196904 A | 7/2000 |
| JP | 2001-051062 | 2/2001 |
| JP | 2001-061062 | 3/2001 |
| JP | 2001-136313 | 5/2001 |
| JP | 2001-160908 | 6/2001 |
| JP | 2002-171408 | 6/2002 |
| JP | 2003-108987 | 4/2003 |
| JP | 2003-187215 | 7/2003 |
| JP | 2003-296723 | 10/2003 |
| JP | 2004-007370 | 1/2004 |
| JP | 2004-054751 | 2/2004 |
| JP | 2004-343365 | 12/2004 |
| JP | 2004-350212 | 12/2004 |
| JP | 2005-182143 A | 7/2005 |
| JP | 2005-192158 | 7/2005 |
| JP | 2005-197996 | 7/2005 |
| JP | 2005-202469 | 7/2005 |
| JP | 2005-242535 | 9/2005 |
| JP | 2005-309651 | 11/2005 |
| JP | 2006-80746 | 3/2006 |
| JP | 2006-121695 | 5/2006 |
| JP | 2006-229537 | 8/2006 |
| JP | 2006-229811 A | 8/2006 |
| JP | 2006-303899 | 11/2006 |
| JP | 2007-89179 | 4/2007 |
| JP | 2007-208413 | 8/2007 |
| WO | WO 2006/036027 A1 | 4/2006 |

OTHER PUBLICATIONS

Japanese Official Action dated Aug. 25, 2009 with English translation.

Web-page from the SITEMAKER website, together with English translation, May 11, 2007, http://www.nl-sitemaker.com/cgi-bin/nextone/sitemaker.cgi?mode=page=page2&category=4.

Web-page from a personal website, namely 'kappa teki denou kukkan', together with English translation, Apr. 12, 2001, http://kapp.cool.ne.jp/howto/cg/comic6.htm.

Manual for EPSON COLORIO PM-D770, together with English translation, Oct. 7, 2004.

Manual for CANOSCAN 8400F, together with English translation, Jul. 18, 2004.

Web-page from Hiroshima Prefecture Website, together with English translation, Mar. 31, 2005, http://www.work2.pref.hiroshima.jp/soho/a/a08/a08061.html.

United States Office Action dated Jul. 25, 2011 received in related U.S. Appl. No. 12/194,680.

Japanese Office Action issued in Patent Application No. JP 2007-226090 on Apr. 12, 2011 together with English language translation.

Japanese Official Action dated Jun. 7, 2011 together with an English language translation from JP 2007-226584 received in related U.S. Appl. No. 12/202,872, filed Sep. 2, 2008.

Japanese Official Action dated Jun. 7, 2011 together with an English language translation from JP 2007-226586 received in related U.S. Appl. No. 12/202,872, filed Sep. 2, 2008.

U.S. Official Action dated Apr. 14, 2011 from related U.S. Appl. No. 12/202,971.

U.S. Official Action dated Apr. 18, 2011 from related U.S. Appl. No. 12/202,872.

U.S. Official Action dated Apr. 19, 2011 from related U.S. Appl. No. 12/200,472.

Japanese Official Action dated May 31, 2011 together with a partial English language translation from JP 2007-226091 from related U.S. Appl. No. 12/194,680.

Japanese Official Action dated Aug. 9, 2011 from related application JP 2007-226088 and U.S. Appl. No. 12/202,872 together with an English-language translation.

United States Official Action dated Sep. 29, 2011 received in related U.S. Appl. No. 12/200,472.

United States Official Action dated Oct. 14, 2011 received in related U.S. Appl. No. 12/202,872.

United States Official Action dated Oct. 20, 2011 received in related U.S. Appl. No. 12/202,885.

Notice of Allowance dated Dec. 30, 2011 received in related U.S. Appl. No. 12/194,680.

United States Office Action dated Apr. 25, 2012 received in related U.S. Appl. No. 12/202,885.

United States Office Action dated Jul. 9, 2012 received in related U.S. Appl. No. 12/200,472.

* cited by examiner

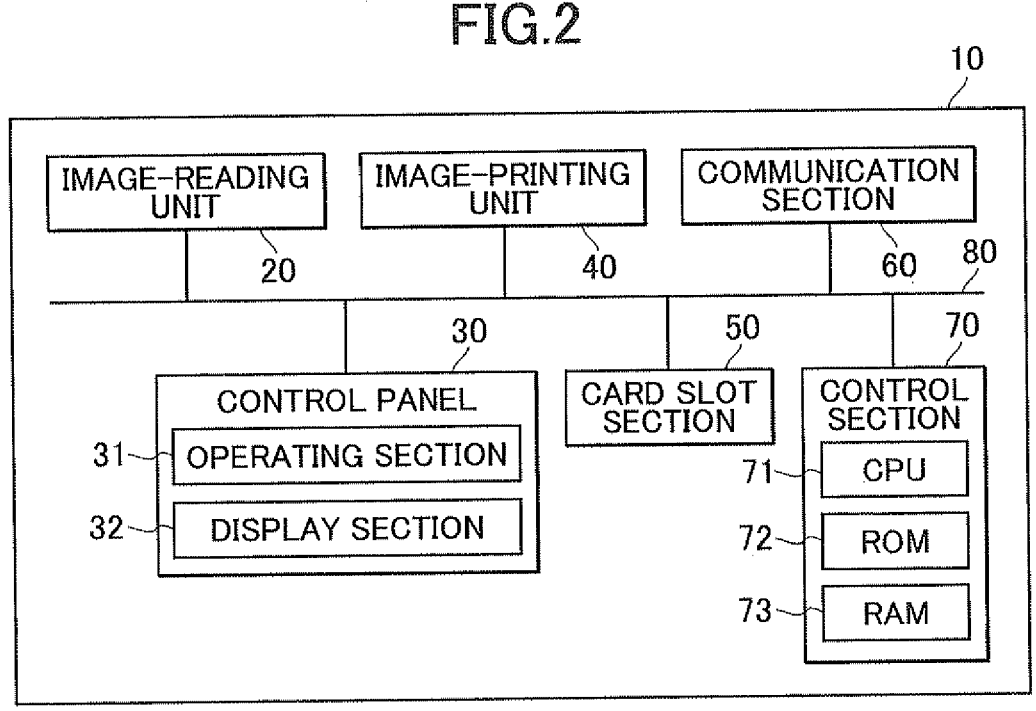
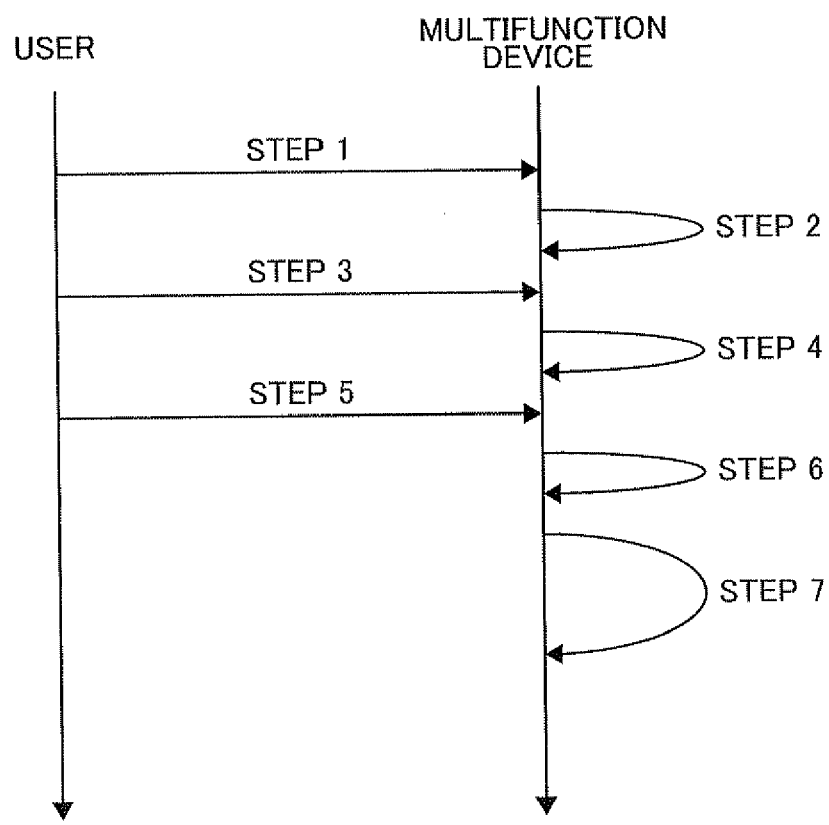

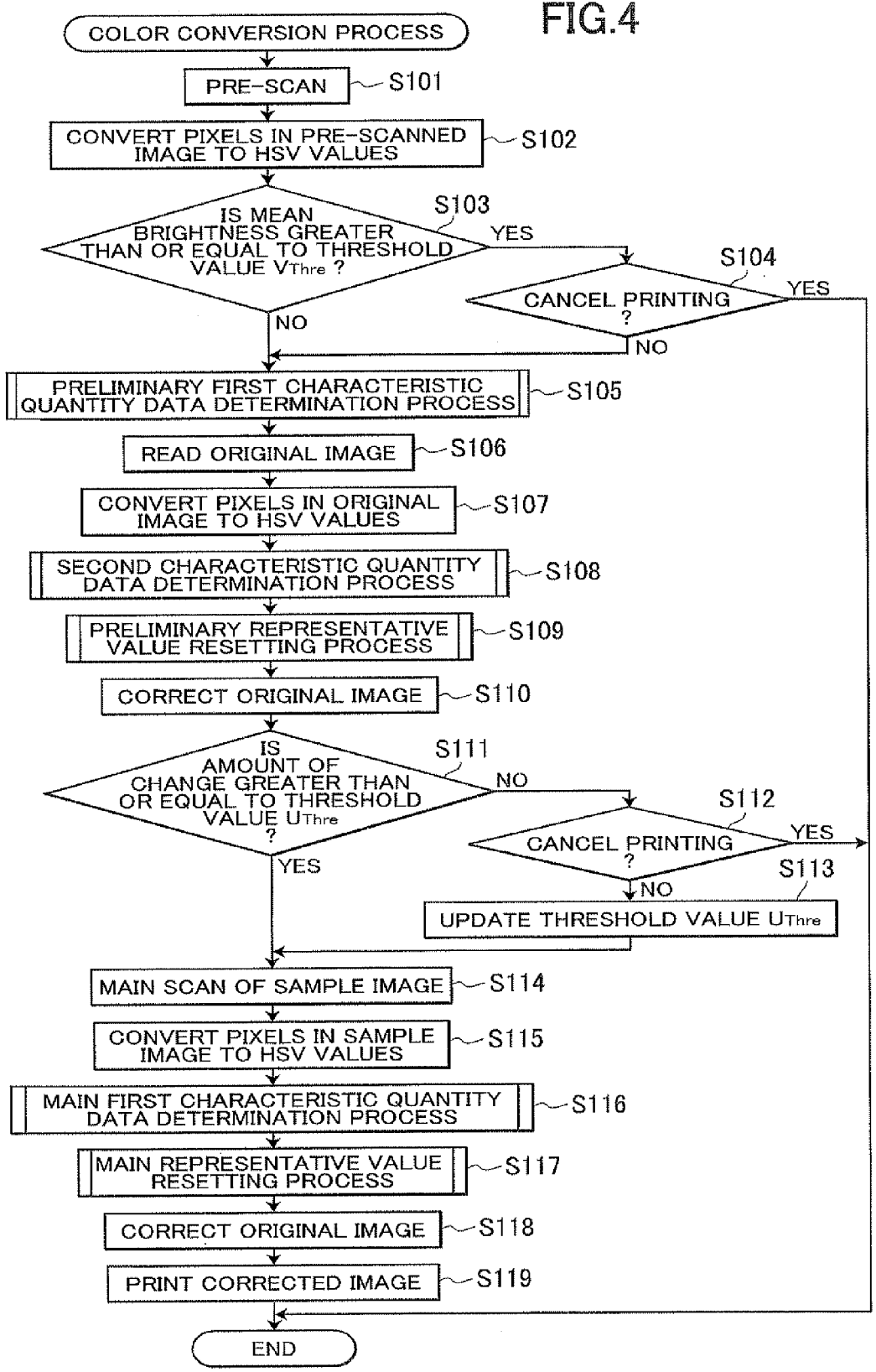

COLOR HUE-REGION 1    COLOR HUE-REGION 2

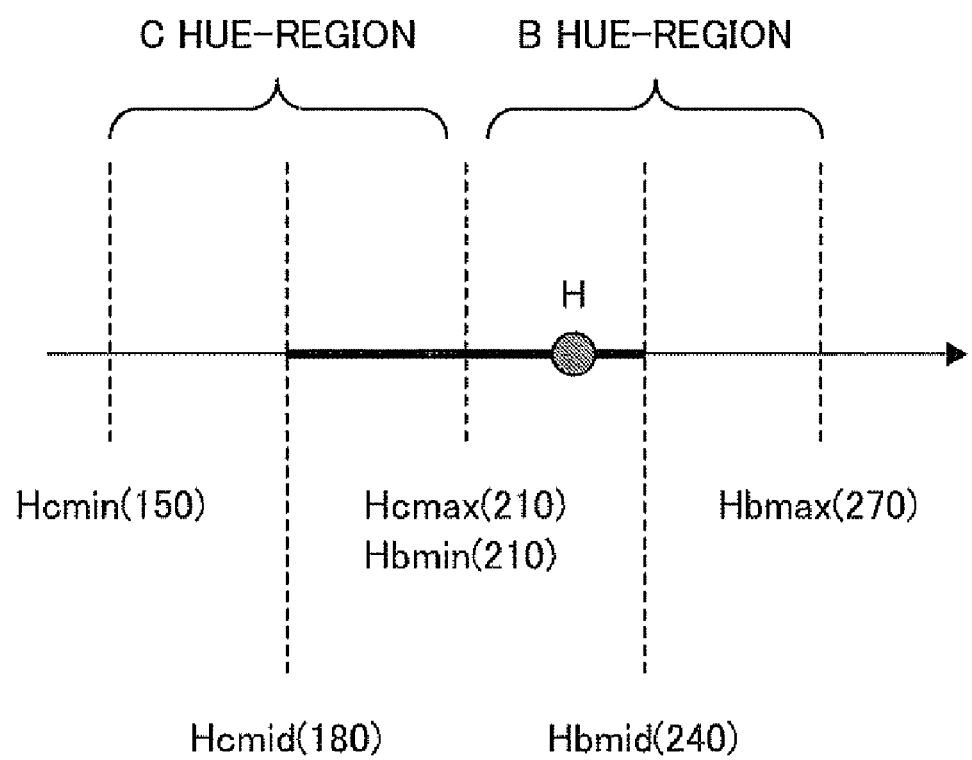

IMAGE PROCESSING DEVICE CAPABLE OF PREVENTING NEEDLESS PRINTING

CROSS REFERENCE TO RELATED APPLICATION

This application claims priority from Japanese Patent Application No. 2007-226090 filed Aug. 31, 2007. The entire content of this priority application is incorporated herein by reference.

TECHNICAL FIELD

The present invention relates to an image processor for performing an image correction process.

BACKGROUND

Image processors that correct images based on user preferences are well known in the art. One such image processor disclosed in Japanese unexamined patent application publication No. 2007-89179 performs image calibration based on calibration data specified by a user selecting a desired type of calibration data from a plurality of types prepared in advance.

SUMMARY

However, since calibration data must be entered in order to perform the desired image correction on the printing device described above, the user must have technical knowledge of the image; in other words, the user cannot easily make intuitive settings.

In view of the foregoing, it is an object of the present invention to provide an image processing device that enables a user to make settings for image correction intuitively.

In order to attain the above and other objects, the invention provides an image processing device including a first image inputting unit, a second image inputting unit, an image processing unit, and a restriction control unit. The first image inputting that inputs a first image. The second image inputting unit inputs a second image. The image processing unit performs a prescribed process on the second image based on the first image. The restriction control unit is configured to restrict the prescribed process based on information of the first image.

According to another aspect, the present invention provides a method executed by an image processing device, the method including: inputting a first image; inputting a second image; performing a prescribed process on the second image based on the first image; and restricting the prescribed process based on information of the first image.

According to another aspect, the present invention provides a computer readable recording medium storing a set of program instructions executable on an image processing device, the instructions including: inputting a first image; inputting a second image; performing a prescribed process on the second image based on the first image; and restricting the prescribed process based on information of the first image.

BRIEF DESCRIPTION OF THE DRAWINGS

The particular features and advantages of the invention as well as other objects will become apparent from the following description taken in connection with the accompanying drawings, in which:

FIG. 2 is a block diagram illustrating the general structure of a control system in the multifunction device;

FIG. 3 is an explanatory diagram showing an overview of user operations and resulting processing on the multifunction device in a color conversion process;

FIG. 4 is a flowchart illustrating steps in the color conversion process;

FIG. 14 is an explanatory diagram showing parts of the B hue-region and C hue-region targeted for conversion.

DETAILED DESCRIPTION

Next, an embodiment of the present invention will be described while referring to the accompanying drawings.

Figure 1:
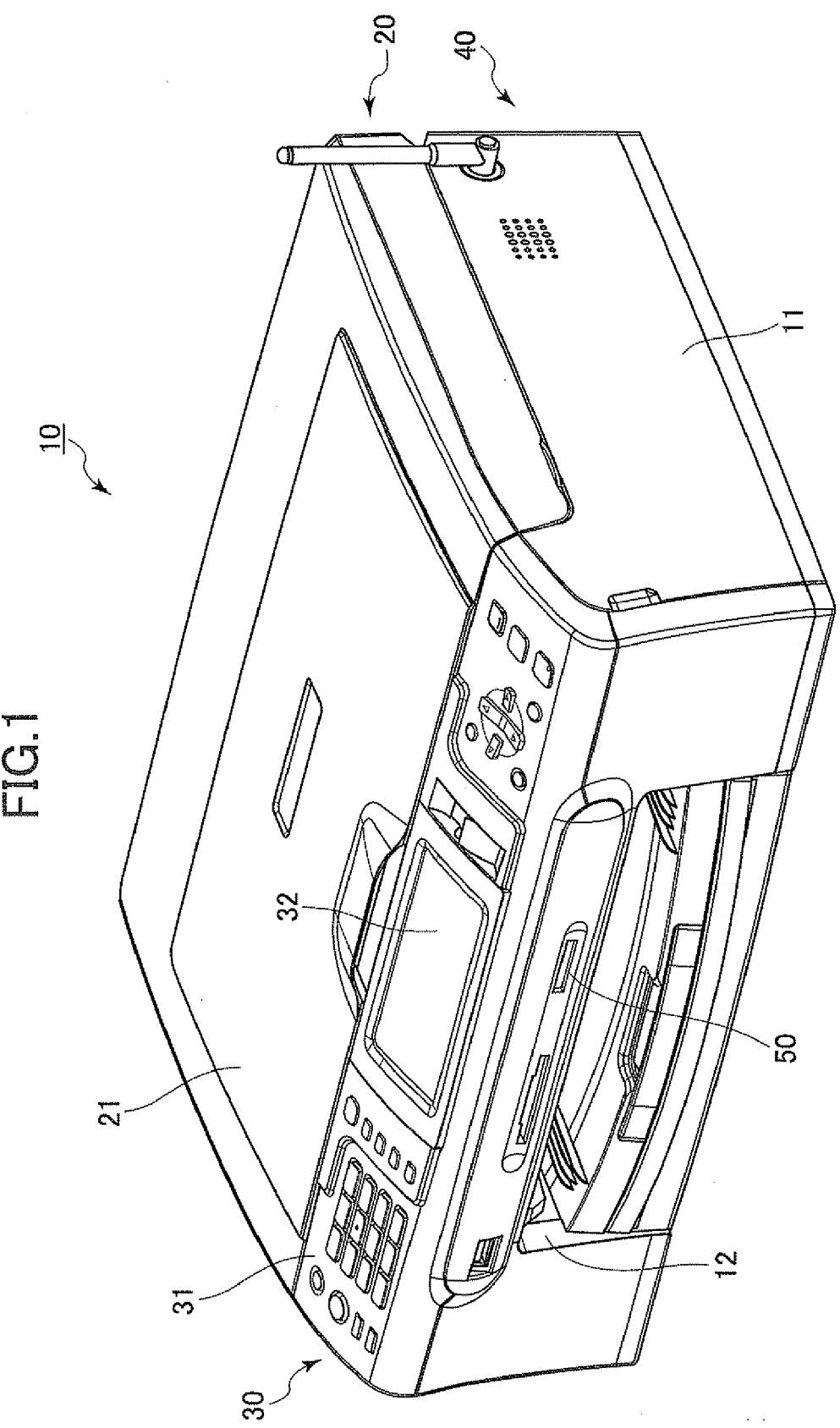
FIG. 1 is a perspective view showing the external appearance of a multifunction device according to an embodiment of the present invention.

FIG. 1 is a perspective view showing the outer appearance of a multifunction device 10 serving as the image processor of the embodiment.

The multifunction device 10 is provided with various functions, including a printer function, scanner function, and color copier function. The multifunction device 10 is configured of a main casing 11, an image-reading unit 20 provided in the upper section of the main casing 11 for scanning original documents, a control panel 30 provided on the front of the image-reading unit 20, and an image-printing unit 40 disposed in the bottom section of the main casing 11 for printing color images on a printing medium.

The image-reading unit 20 is a flatbed scanner that optically reads images from an original document placed on a document-supporting surface configured of a glass bed. A thin plate-shaped document cover 21 covers the top of the document-supporting surface. By opening the document cover 21 upward, the user can place an original document on the document-supporting surface or remove an original document therefrom. The surface of the document cover 21 opposing an original document positioned on the document-supporting surface is white in color. Therefore, when scanning an image with the document cover 21 closed (the state shown in FIG. 1), areas around the original document on the document-supporting surface are scanned as white.

The control panel 30 provided on the front (near side) of the image-reading unit 20 is configured of an operating section 31 including various operating buttons, and a display section 32 (liquid crystal display, for example) for displaying messages, images, and other data.

The image-printing unit 40 provided below the image-reading unit 20 is capable of printing color images on paper or another printing medium. After an image is printed on the paper, the image-printing unit 40 discharges the paper through an opening 12 formed in the front surface of the main casing 11.

The multifunction device 10 also includes a card slot section 50 on the front surface of the main casing 11 above the opening 12. The card slot section 50 accepts the insertion of various memory cards (portable storage media), such as an SD Card or CompactFlash card. The multifunction device 10 also has a direct print function for directly reading from a memory card images taken by a digital still camera or the like, rather than reading images from a personal computer or other data processor, and for printing these images.

Next, the control system of the multifunction device 10 will be described. FIG. 2 is a block diagram showing the overall structure of this control system. As shown in FIG. 2, the multifunction device 10 includes the image-reading unit 20, control panel 30, image-printing unit 40, and card slot section 50 described above, as well as a communication section 60 and a control section 70 connected to one another via a signal line 80.

When connected to a communication cable, such as a LAN cable, the communication section 60 transmits and receives data via the communication cable. Hence, the communication section 60 functions to perform data communications with an external device such as a personal computer connected to the LAN or a Web server on the Internet.

The control section 70 is primarily configured of a microcomputer having a CPU 71, a ROM 72, and a RAM 73, and performs overall control of the components constituting the multifunction device 10. The ROM 72 stores programs executed by the CPU 71 to implement a color conversion process described later.

Next, an overview of the color conversion process performed on the multifunction device 10 will be described. The multifunction device 10 performs color conversion on a user's selected image based on an image serving as a model for color conversion (hereinafter referred to as a "sample image"). First, the basic steps in this color conversion process will be described with reference to FIG. 3.

First, the user places an original document on which a sample image is printed, such as a photograph, on the document-supporting surface of the image-reading unit 20 and operate the operating section 31 to input his/her instruction to scan the document (step 1). At this time, the multifunction device 10 reads the sample image within a specified region of the document-supporting surface (a user-specified size, such as L-size (photo paper), A4 size, or the like) (step 2). Through these processes, a sample image is read from the original document resting on the document-supporting surface.

Next, the user inserts a memory card storing images as candidates for color conversion into the card slot section 50 (step 3). The multifunction device 10 recognizes the inserted memory card and prompts the user to select an image to be subjected to color conversion from among the images stored on the memory card (step 4). Here, any suitable process known in the art may be employed as the process for prompting the user to select an image, such as a process for displaying images stored in the memory card on the display section 32 and enabling the user to select an image through operations on the operating section 31.

Once the user has selected an image to be subjected to color conversion (step 5), the multifunction device 10 reads the selected image (step 6). In the following description, the selected image will be referred to as the "original image."

Subsequently, the multifunction device 10 performs a process to correct the original image read from the memory card using the sample image read from the image-reading unit 20 as a model (step 7). In this procedure, the original image is read from the memory card after reading the sample image from the image-reading unit 20, but the present invention is not limited to this order. It is also possible to read the original image from the memory card first and subsequently read the sample image with the image-reading unit 20.

Through this color conversion process, the user can execute a color conversion process on an original image that is intuitively based on a sample image and requires only simple operations to perform.

Since the multifunction device 10 has the document cover 21 covering the document-supporting surface, there may be cases in which the user initiates color conversion thinking that the original document has been placed on the document-supporting surface when in fact the document has not been placed on the document-supporting surface. It is also conceivable that the sample image may have little effect on the color conversion process.

Therefore, the multifunction device 10 is configured to avoid unnecessarily printing images that the user does not need.

Next, a detailed description of the color conversion process executed on the multifunction device 10 will be given.

FIG. 4 is a flowchart illustrating steps in the color conversion process executed by the CPU 71 of the multifunction device 10. In S101 at the beginning of this color conversion process, the CPU 71 pre-scans a set of scanning region within the document-supporting surface at a resolution lower than normal resolution, such as 100 dpi. In the embodiment, the format for the scanned image data is the RGB format, but the present invention is not limited to this format.

In S102 the CPU 71 performs a process to convert each pixel constituting the low-resolution image read in the pre-scan of S101 (hereinafter referred to as the "pre-scanned image") to HSV parameters, where H is a value from 0 to 360 and S and V are values between 0 and 1.

Next, the process for converting pixels to HSV parameters in S102 of FIG. 4 will be described. When the original image is acquired as RGB parameters, the RGB parameters for each pixel may be converted to HSV parameters according to the following equations. However, the following conversion equation is merely an example, and the multifunction device 10 may perform conversion according to another method.

First, the value "V" is calculated by the following formula:

$$V = \max(R \div 255, G \div 255, B \div 255),$$

wherein max(a, b, c) denotes the largest value among a, b, and c.

Based on the determined value "V", the value "S" is calculated by the following formulas:
when V is 0, S=0; and $$\text{when } V \text{ is not } 0, S = \{V - \min(R \div 255, G \div 255, B \div 255)\} \div V,$$

wherein min(a, b, c) denotes the smallest value among a, b, and c.

Based on the value "V", the value "r", "g", and "b" are determined by the following formulas:

$$\text{when } \{V - \min(R \div 255, G \div 255, B \div 255)\} \text{ is not } 0,$$

$$r = (V - R \div 255) \div (V - \min(R \div 255, G \div 255, B \div 255)),$$

$$g = (V - G \div 255) \div (V - \min(R \div 255, G \div 255, B \div 255)),$$

$$b = (V - B \div 255) \div (V - \min(R \div 255, G \div 255, B \div 255)); \text{ and}$$

when $\{V-\min(R\div255, G\div255, B\div255)\}$ is 0, $r=0$, $g=0$, $b=0$.

Based on the values "r", "g", and "b", the value "H" is calculated by the following formulas:

when $V=R\div255, H=60\times(b-g)$;

when $V=G\div255, H=60\times(2+r-g)$; and when $V=B\div255, H=60\times(4+g-r)$.

In S103 the CPU 71 calculates a mean brightness $V_{mean}$ based on the HSV parameters obtained in the conversion process of S102, where the mean brightness $V_{mean}$ is the mean V value in the overall pre-scanned image. The CPU 71 then determines whether this mean brightness $V_{mean}$ is greater than or equal to a predetermined threshold value $V_{Thre}$ (0.97, for example). Here, the threshold value $V_{Thre}$ is set in advance as a reference value for determining whether a document has been placed on the document-supporting surface of the image-reading unit 20. When the mean brightness $V_{mean}$ is greater than or equal to the threshold value $V_{Thre}$ (i.e., when it is determined that the image is white only), there is a high probability that an original document has not been placed on the document-supporting surface.

If the CPU 71 determines in S103 that the mean brightness $V_{mean}$ is greater than or equal to the threshold value $V_{Thre}$ (S103: YES), in S104 the CPU 71 determines whether to cancel the printing operation. Specifically, the CPU 71 displays a message on the display section 32 prompting the user to indicate through operations on the operating section 31 whether to cancel the printing operation and confirms the user's desire to cancel or not cancel the printing operation.

If the CPU 71 determines in S104 that the user wishes to cancel the printing operation, the CPU 71 ends the current color conversion process with no further action. However, if the user does not wish to cancel the printing operation, the CPU 71 advances to S105.

In S105 the CPU 71 performs a preliminary first characteristic quantity data determination process for determining a set of first characteristic quantity data representing a characteristic of the sample image based on the HSV parameters extracted in the conversion process of S102 from the pre-scanned sample image (low-resolution sample image). The preliminary first characteristic quantity data determination process will be described later in greater detail with reference to FIG. 5.

In S106 the CPU 71 loads a user's selected image to be subjected to color conversion (original image) from the memory card into the RAM 73. In the embodiment, the original image will be described as having an RGB format, but the present invention is not particularly limited to this format.

In S107 the CPU 71 performs a process to convert each pixel in the original image read in S106 to a set of HSV parameters. In S108 the CPU 71 performs a second characteristic quantity data determination process for determining a set of second characteristic quantity data denoting a characteristic of the original image based on the HSV parameters obtained in the conversion process of S107. The second characteristic quantity data determination process will be described later in greater detail with reference to FIG. 6.

In S109 the CPU 71 performs a preliminary representative value resetting process for resetting the values of the first characteristic quantity data of the pre-scanned sample image and the second characteristic quantity data of the original image for those hue-regions that should not be subjected to color conversion (color correction) of S110 to be described below. This representative value resetting process will be described later in greater detail with reference to FIG. 8.

In S110 the CPU 71 corrects the original image based on the first characteristic quantity data determined in S105 based on the pre-scanned image or reset in S109 and second characteristic quantity data determined in S108 or reset in S109. Details of this correction method will be described later.

In S111 the CPU 71 determines whether the amount of change in the original image before and after correction in S110 is greater than or equal to a threshold value $U_{Thre}$. In the embodiment, the CPU 71 calculates differences between RGB values for the pixels in the original image prior to correction and RGB values for the corresponding pixels in the original image after correction and sets, as the amount of change, the maximum difference among all the differences.

If the CPU 71 determines in S111 that the amount of change in the original image from correction is less than the threshold value $U_{Thre}$ (S111: NO), then in S112 the CPU 71 determines whether or not to cancel the printing operation. Specifically, the CPU 71 displays a message in the display section 32 prompting the user to indicate through operations on the operating section 31 whether or not to cancel the printing operation and confirms the user's wishes.

If the CPU 71 determines in S112 that the user wishes to cancel the printing operation (S112: YES), the CPU 71 ends the current color conversion process with no further action. However, if the user does not wish to cancel the printing operation (S112: NO), in S113 the CPU 71 updates the threshold value $U_{Thre}$ and advances to S114. Specifically, the CPU 71 resets the threshold value $U_{Thre}$ to the amount of change in the original image from conversion in S110. In other words, when the user allows the printing operation despite the amount of change being less than the threshold value $U_{Thre}$, then the CPU 71 lowers the threshold value $U_{Thre}$ to be used in subsequent printing operation to the current change amount, thereby adjusting the threshold value $U_{Thre}$ to the user's preference.

The CPU 71 advances directly to S114 if the amount of change in the original image is found in S111 to be greater than or equal to the threshold value $U_{Thre}$. In S114 the CPU 71 acquires a high-resolution sample image (main-scanned sample image) by scanning the specified scanning region of the document-supporting surface at the normal resolution (a higher resolution than that used in the pre-scan).

In S115 the CPU 71 performs a process to convert each pixel in the sample image read in S114 to a set of HSV parameters. In S116 the CPU 71 performs a main first characteristic quantity data determination process for determining the first characteristic quantity data representing a characteristic of the sample image (the sample image scanned at the normal resolution) based on the HSV parameters obtained in the conversion process of S115 for the main-scanned sample image. The main first characteristic quantity data determination process of S116 is the same as the preliminary first characteristic quantity data determination process except that the process of S105 determines the first characteristic quantity data based on the HSV parameters extracted from the pre-scanned sample image, while the process of S116 determines the first characteristic quantity data based on the HSV parameters extracted from the main-scanned sample image.

In S117 the CPU 71 performs a main representative value resetting process for resetting the values of the first characteristic quantity data for the main-scanned sample image and the second characteristic quantity data for those hue-regions that should not be subjected to color conversion (color correction) of S118 to be described below. The main representative value resetting process of S117 is the same as the preliminary representative value resetting process of S109 except that the main representative value resetting process of S117 resets the values of the first characteristic quantity data for the main-scanned sample image, while the preliminary representative value resetting process of S109 resets the values of the first characteristic quantity data for the pre-scanned sample image.

In S118 the CPU 71 corrects the original image based on the first characteristic quantity data obtained in S116 (for the main-scanned sample image) and second characteristic quantity data. The process for correcting the original image in S118 in the same as that in S110 except that the process of S118 uses the first characteristic quantity data obtained in S116 or reset in S117, while the process of S110 uses the first characteristic quantity data obtained in S105 or reset in S109.

In S119 the CPU 71 controls the printing section 40 to print the corrected original image, and then the CPU 71 ends the color conversion process.

Figure 5:
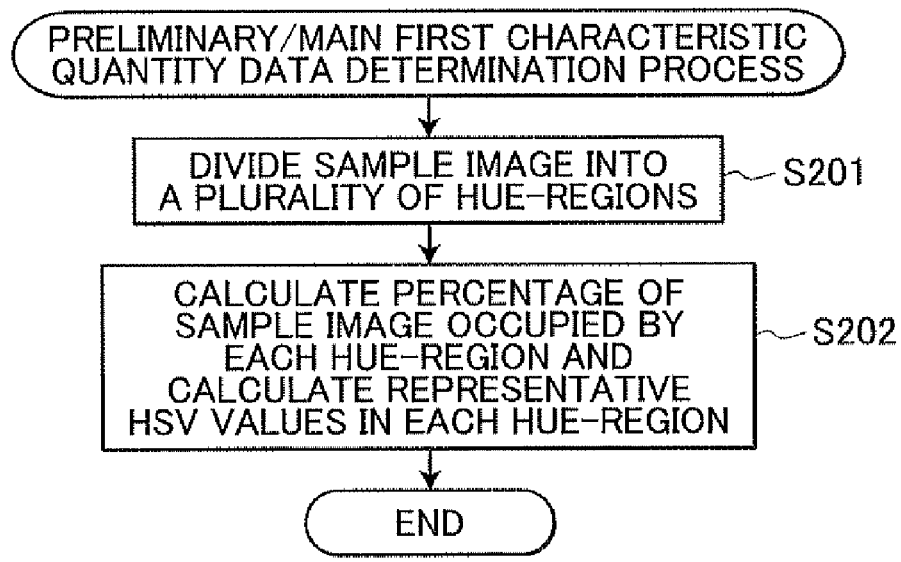
FIG. 5 is a flowchart illustrating steps in a first characteristic quantity data determination process in the color conversion process of FIG. 4.

Next, the preliminary first characteristic data determination process of S105 in FIG. 4 for extracting the first characteristic quantity data from the pre-scanned sample image will be described with reference to FIG. 5. FIG. 5 is a flowchart illustrating steps in the preliminary first characteristic quantity data determination process. In the following process, it will be assumed that H takes on a value of at least −30 and less than 330. When H does not fall within this range, H is adjusted to a value within the range according to a suitable conversion, such as H=H+360×n or H=H−360×n, where n is an integer.

In S201 of the first characteristic quantity data determination process, the CPU 71 divides the sample image into a plurality of hue-regions (six commonly used hue regions in this example). Specifically, each of the pixels in the sample image is allocated into either one of the following six hue-regions based on its H value:
R hue-region: grater than or equal to −30 and less than 30
Y hue-region: grater than or equal to 30 and less than 90
G hue-region: grater than or equal to 90 and less than 150
C hue-region: grater than or equal to 150 and less than 210
B hue-region: grater than or equal to 210 and less than 270
M hue-region: grater than or equal to 270 and less than 330

Hence, the CPU 71 performs a process to sort all the pixels of the original image into six classifications based on the above classification criteria for the hue value. The correspondence between each hue-region and the H value given above is merely an example and may be modified as appropriate.

In S202 the CPU 71 calculates representative values (HSV values) for each hue-region in which pixels have been sorted in S201 and the percentage of the sample image that each hue-region occupies.

The representative values (HSV values) for each hue-region are defined as follows.
Representative values for the R hue-region: sHr, sSr, sVr
Representative values for the G hue-region: sHg, sSg, sVg
Representative values for the B hue-region: sHb, sSb, sVb
Representative values for the C hue-region: sHc, sSc, sVc
Representative values for the M hue-region: sHm, sSm, sVm
Representative values for the Y hue-region: sHy, sSy, sVy Here, the representative values in each hue-region are average values of the HSV values of all the pixels allocated in the subject hue-region. The representative values for each hue-region may be median values or middle values of the HSV values of all the pixels in the subject hue-region.

The percentage that each hue-region occupies in the sample image is defined as follows:
Percentage that the R hue-region occupies in the sample image: sRateR
Percentage that the G hue-region occupies in the sample image: sRateG
Percentage that the B hue-region occupies in the sample image: sRateB
Percentage that the C hue-region occupies in the sample image: sRateC
Percentage that the M hue-region occupies in the sample image: sRateM
Percentage that the Y hue-region occupies in the sample image: sRateY The percentage for the R hue-region, for example, may be defined as sRateR=(number of pixels in the R hue-region of the sample image)÷(total number of pixels in the sample image), or may be defined according to another equation.

Figure 6:
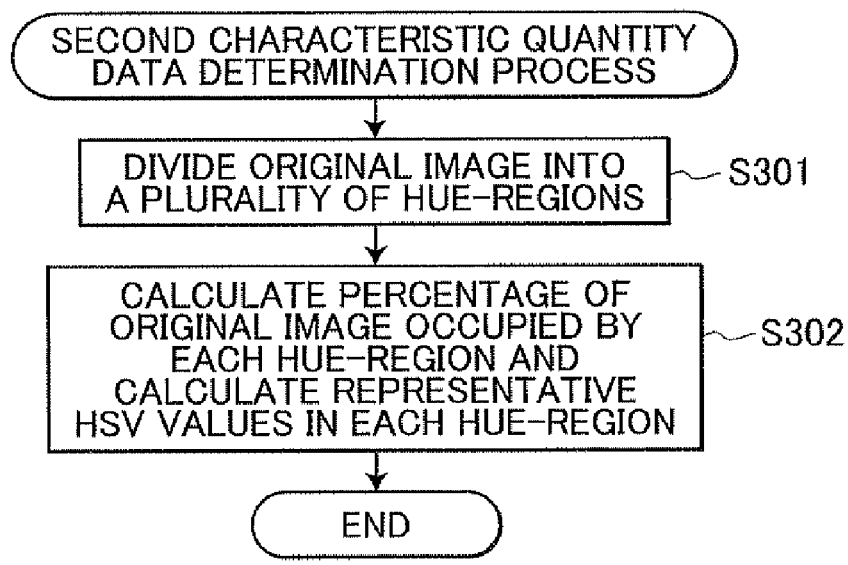
FIG. 6 is a flowchart illustrating steps in a second characteristic quantity data determination process in the color conversion process of FIG. 4.

Next, the second characteristic data determination process of S108 in FIG. 4 for extracting the second characteristic quantity data from the original image will be described with reference to FIG. 6. FIG. 6 is a flowchart illustrating steps in the second characteristic quantity data determination process. Similarly to the pixels in the sample image, all the pixels in the original image are sorted in the six hue-regions R, G, B, C, M and Y in a manner the same as S105. It is noted that the second characteristic quantity data obtained for the original image in S108 includes the following data:
Representative values for the R hue-region: iHr, iSr, iVr
Representative values for the G hue-region: iHg, iSg, iVg
Representative values for the B hue-region: iHb, iSb, iVb
Representative values for the C hue-region: iHc, iSc, iVc
Representative values for the M hue-region: iHm, iSm, iVm
Representative values for the Y hue-region: iHy, iSy, iVy
Percentage that the R hue-region occupies in the original image: iRateR
Percentage that the G hue-region occupies in the original image: iRateG
Percentage that the B hue-region occupies in the original image: iRateB
Percentage that the C hue-region occupies in the original image: iRateC
Percentage that the M hue-region occupies in the original image: iRateM
Percentage that the Y hue-region occupies in the original image: iRateY During the preliminary representative value resetting process in S109, the CPU 71 determines whether each hue-region should be subjected to the color correction of S110. In other words, the CPU 71 determines whether each hue-region should be a target of conversion of S110. If the CPU 71 determines that the hue-region in question should not be a target of conversion, the CPU 71 resets the representative values both in the first characteristic quantity data and in the second characteristic quantity data for the subject hue-region.

Next, the process performed in S110 of FIG. 4 to convert the original image based on the first and second characteristic quantity data will be described in detail. In this process, the multifunction device 10 converts the H value, S value, and V value of each pixel in the original image.

Figure 7:
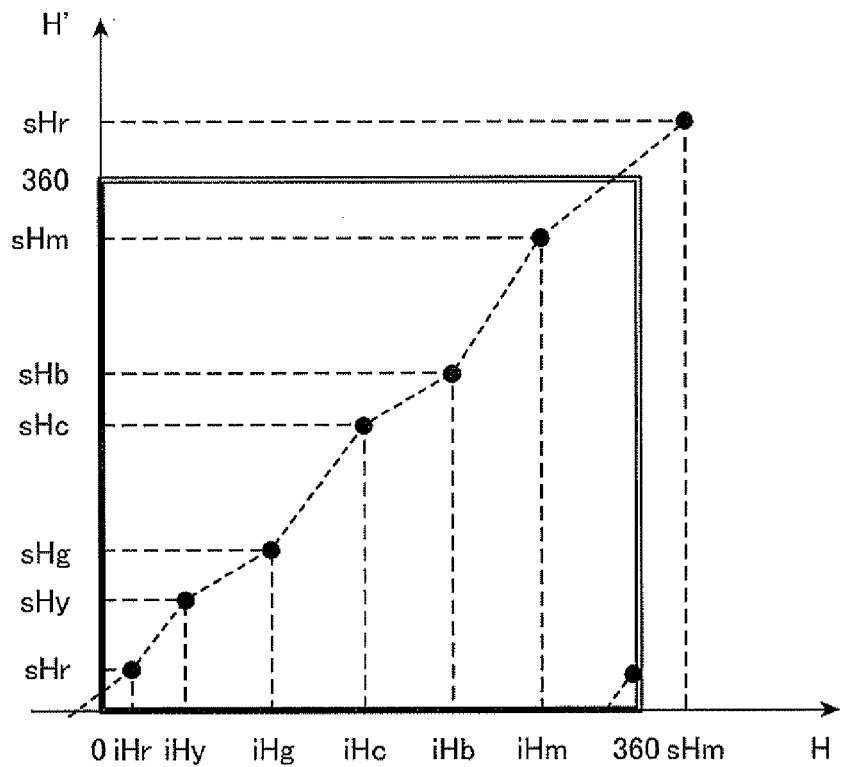
FIG. 7 is a graph for a hue correction table.

First, the conversion process for the H value of each pixel in the original image will be described. Representative H values for all the hue-regions are plotted in a graph, as shown in FIG. 7, with the X-axis denoting the representative H values of the original image and the Y-axis denoting the representative H values (denoted by H') of the first characteristic quantity data. Subsequently, a hue conversion table based on the graph in FIG. 7 is created as indicated by a broken line using linear interpolation, for example, between the plotted points.

The H value of each pixel in the original image is corrected into a corrected H' value by applying the hue conversion table to the H value in each pixel. More specifically, the corrected H' value is calculated according to the following equation:

$$H'=(y2-y1)\div(x2-x1)\times H-(y2-y1)\div(x2-x1)\times x2+y2 \quad \text{(Equation 1)}$$

Here, H' is set to H'−360 when H'>360.
Here, x1, x2, y1, and y2 are defined as follows.
When H<iHr,
(x1,y1)=(iHm−360,sHm−360), and
(x2,y2)=(iHr,sHr).
When iHr≦H<iHy,
(x1,y1)=(iHr,sHr), and
(x2,y2)=(iHy,sHy).
When iHy≦H<iHg,
(x1,y1)=(iHy,sHy), and
(x2,y2)=(iHg,sHg).
When iHg≦H<iHc,
(x1,y1)=(iHg,sHg), and
(x2,y2)=(iHc,sHc).
When iHc≦H<iHb,
(x1,y1)=(iHc,sHc), and
(x2,y2)=(iHb,sHb).
When iHb≦H<iHm,
(x1,y1)=(iHb,sHb), and
(x2,y2)=(iHm,sHm).
When iHm≦H,
(x1,y1)=(iHm,sHm), and
(x2,y2)=(iHr+360,sHr+360).

Next, conversion of the S value and V value in each pixel will be described. The S and V values of each pixel in the original image are converted in a manner that is determined dependent on the hue-region in which the hue value H of the subject pixel is allocated. For example, values "S" and "V" for a pixel, whose H value is allocated in the R hue-region, are converted into corrected values "S'" and "V'" by the following equations:
When S≦iSr, $$S'=S\times(sSr\div iSr) \quad \text{(Equation 2)}.$$

When S>iSr, $$S'=1+(S-1)\times\{(1-sSr)\div(1-iSr)\} \quad \text{(Equation 3)}.$$

When V≦iVr, $$V'=V\times(sVr\div iVr) \quad \text{(Equation 4)}.$$

When V>iVr, $$V'=1+(V-1)\times\{(1-sVr)\div(1-iVr)\} \quad \text{(Equation 5)}.$$

S and V values for pixels, whose H values are allocated in other hue-regions, can be similarly calculated. Below, a conversion table defined by the above-described conversion method for S values is referred to as a saturation conversion table, while a conversion table defined by the above-described conversion method for the V value is referred to as a lightness conversion table.

Next, the HSV values of each pixel that has been converted as described above is converted to a format (RGB values, for example) suitable for the image printing section 40. The following method of conversion is merely an example, and it should be apparent that conversion may be performed according to another method.

Below, in, fl, m, and n are parameters used in the process of calculating RGB values from HSV values. Here, in will be the integer portion of (H'÷60) and fl the decimal portion of (H'÷60).
When in is even, fl=1−fl.
m=V'×(1−S')
n=V'×(1−S'×fl)
When in is 0,
R=V'×255,
G=n×255, and
B=m×255.
When in is 1,
R=n×255,
G=V'×255, and
B=m×255.
When in is 2,
R=m×255,
G=V'×255, and
B=n×255.
When in is 3,
R=m×255,
G=n×255, and
B=V'×255.
When in is 4,
R=n×255,
G=m×255, and
B=V'×255.
When in is 5,
R=V'×255,
G=m×255, and
B=n×255.

Figure 8:
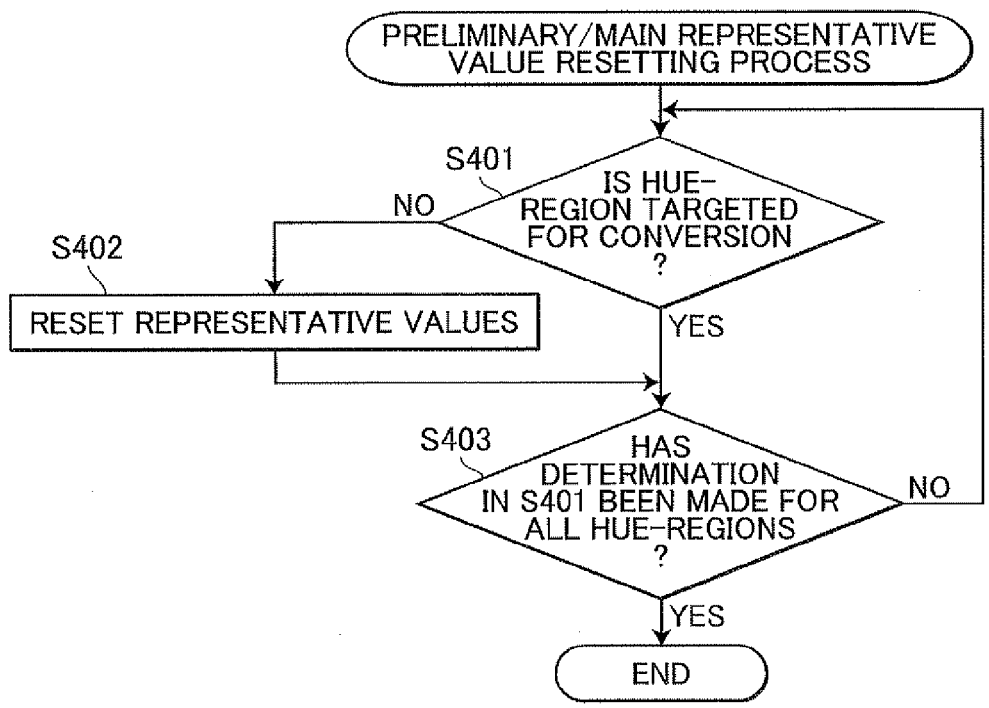
FIG. 8 is a flowchart illustrating steps in a representative value resetting process.

FIG. 8 is a flowchart illustrating steps in the representative value resetting process of S109 in FIG. 4. In S401 of this process, the CPU 71 determines whether one hue-region among the six hue-regions should be a target of conversion. The CPU 71 performs this determination by determining whether the subject hue-region meets a prescribed condition.

The CPU 71 advances to S402 when determining that the hue-region is not a target of conversion (S401: NO) and advances to S403 when determining that the hue-region is a target of conversion (S401: YES) In S402 the CPU 71 resets the representative values for the subject hue-region and subsequently advances to S403. More specifically, for the hue-region that is not a target of conversion, the CPU 71 resets the hue representative values in the first characteristic quantity data and in the second characteristic quantity data to be equal to each other, resets the saturation representative values in the first characteristic quantity data and in the second characteristic quantity data to be equal to each other, and resets the brightness representative values in the first characteristic quantity data and in the second characteristic quantity data to be equal to each other. For example, the CPU 71 resets the hue representative values to the middle value of the subject hue region, resets the saturation representative values to the middle value (0.5) in the range of saturation (0 to 1), and resets the brightness representative values to the middle value (0.5) in the range of brightness (0 to 1).

In S403 the CPU 71 determines whether the process in S401 for determining whether a hue-region is to be converted has been performed for all hue-regions (six hue-regions in the example). If there remain any hue-regions for which the determination of S401 has not yet been performed (S403: NO), the CPU 71 returns to S401. When a determination has been performed on all hue-regions (S403: YES), the CPU 71 ends the representative value resetting process. Examples of the method of the judgment in S401 includes: (A) a method of using a threshold thre; and (B) a method of using data of a hue-region having the largest area.

(A) Method Using a Threshold Thre

The prescribed condition used in the judgment of S401 described above is a relationship between the size of the hue-region in question and a threshold Thre. When the percentage of the original image or sample image occupied by the subject hue-region is less than the threshold Thre (yes in S401), the CPU 71 changes in S402 the representative values in the first characteristic quantity data of the original image and the representative values in the second characteristic quantity data of the sample image related to this hue-region to the same values, so that conversion will be executed by using the new representative values. The representative values can be changed or reset in the following way:

When sRateR<Thre or iRateR<Thre,
sHr=0, sSr=0.5, sVr=0.5,
iHr=0, iSr=0.5, iVr=0.5.
When sRateG<Thre or iRateG<Thre,
sHg=120, sSg=0.5, sVg=0.5,
iHg=120, iSg=0.5, iVg=0.5.
When sRateB<Thre or iRateB<Thre,
sHb=240, sSb=0.5, sVb=0.5,
iHb=240, iSb=0.5, iVb=0.5.
When sRateC<Thre or iRateC<Thre,
sHc=180, sSc=0.5, sVc=0.5,
iHc=180, iSc=0.5, iVc=0.5.
When sRateM<Thre or iRateM<Thre,
sHm=300, sSm=0.5, sVm=0.5,
iHm=300, iSm=0.5, iVm=0.5.
When sRateY<Thre or iRateY<Thre,
sHy=60, sSy=0.5, sVy=0.5,
iHy=60, iSy=0.5, iVy=0.5.

The above example employs the middle value 0.5 of possible values (0-1) for the S value and V value, and also employs the middle value of the corresponding hue-region for the H value. However, the representative values described above are merely an example, and the present invention is not limited to these values.

When converting a pixel using the equations described above (Equations 2-5), the S and V values of the pixel do not change using the representative values described above. For example, when S≦iSr for the R hue-region, S' is calculated according to equation 2 as follows.

$$S'=S \times (sSr \div iSr)$$

However, since sSr=0.5 and iSr=0.5 in this equation, the equation becomes:

$$S'=S \times (0.5 \div 0.5)=S \qquad \text{(Equation 6)}$$

Similarly, S'=S when S>iSr.

The V values in this hue-region are not changed, either. The S and V values in other hue-regions are also not changed in the same manner as described above for R hue-region.

Further, by resetting the representative values for some hue-region in a manner described above, it is possible to reduce the amount of conversion in the hue-region. In other words, the amount of conversion can be reduced by modifying the representative values, even when using the conversion equation described above (Equation 1).

Next, a method of determining the threshold Thre will be described. This value Thre can be set based on a sensory evaluation (visual impression). In sensory evaluations, the inventors have confirmed that any hue-region is likely to be perceived when the hue-region occupies more than about 6% of the entire image area. Hence, the threshold Thre can be set to 6%. However, the present invention is not limited to a threshold Thre of 6%.

It is also possible to set the threshold Thre to such a value that can extract hue-regions having a large area relative to other hue-regions. For example, because the image is divided into six hue-regions, the threshold Thre can be set to the inverse value, or ⅙ of the total number of the hue-regions.

The number "six" given as an example of the number of hue-regions is identical to a number that is obtained by subtracting the number of the achromatic colors white and black from the number of vertices (eight that is possessed by an RGB color space, which is one of color gamuts expressing colors). The human eyes can differentiate colors sufficiently when the hues are divided into six hue-regions. If the number of the hue regions is set less than six, there is a possibility that the user may not feel that the original image is modified based on the sample image. Dividing the image into more than six hue-regions will increase the conversion accuracy. However, it is likely that the user will not be able to distinguish the differences in color. Further, the number of calculations increases when the number of divisions increases. When using a printer, such an increase in computations increases the time required to obtain the calibrated image as the printing results, potentially leading to more frustration for the user. Therefore, it is thought that six is a preferable number of divisions.

While the same threshold is used for all hue-regions in the above example, a different threshold Thre may be used for each hue-region.

(B) Method Using Data of a Hue-Region Having the Largest Area

In the above method (A), a threshold Thre is set and representative values are modified based on this threshold Thre, thereby performing control to suspend the image correction process in some hue-regions and to reduce the amount of conversions. Contrarily, the method (B) enables the image correction process to use data of a hue-region having the largest area in the image in order to incorporate only specific colors of the sample image in the original image.

Figure 9:
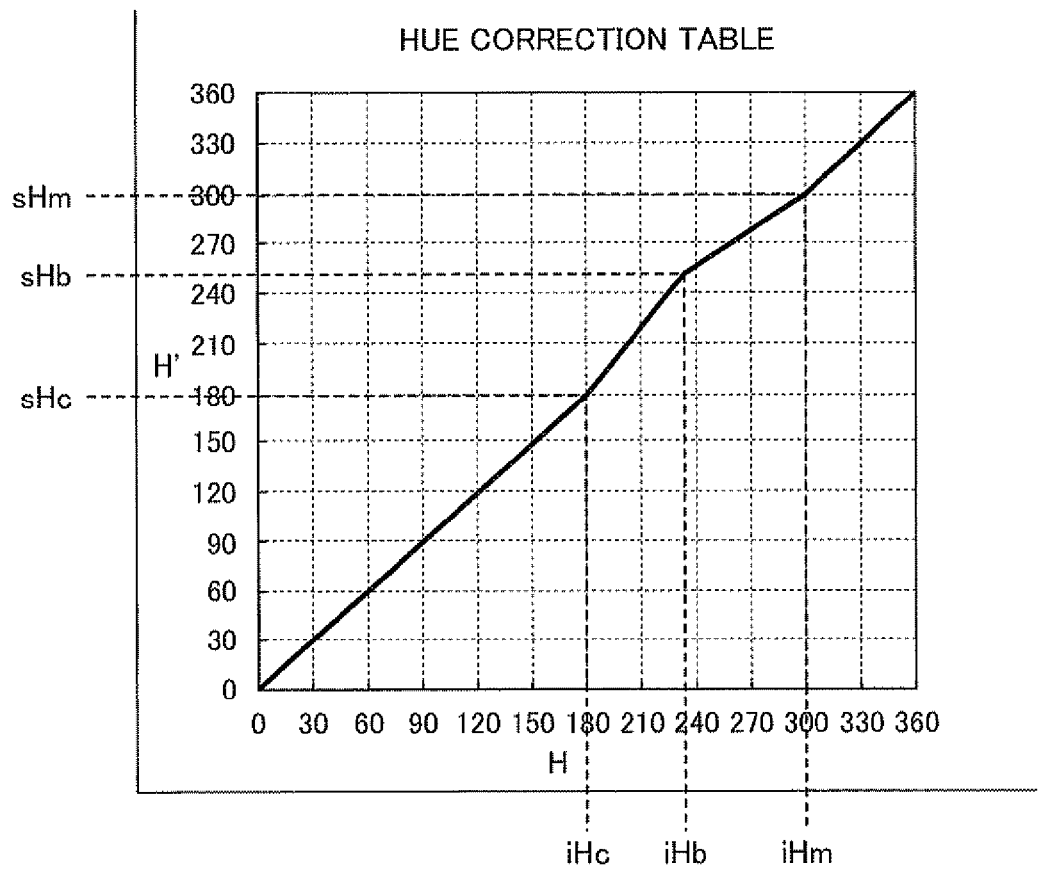
FIG. 9 is a graph for a hue correction table created when only the B hue-region is converted.

In this method, the prescribed condition in the determination of S401 in FIG. 9 is whether a hue-region having the largest area in the original image is the same as a hue region having the largest area in the sample image, and the hue-region in question is the hue-region having the largest area both in the original image and in the sample image. If the judgment is S401 is affirmative, the representative values fir hue-regions other than the subject hue-region are reset according to the following equations, where iMaxRate is the percentage of the original image occupied by the largest-area hue-region in the original image, and sMaxRate is the percentage of the sample image occupied by the largest-area hue-region in the sample image.

When sRateR≠sMaxRate or iRateR≠iMaxRate,
sHr=0, sSr=0.5, sV=0.5,
iHr=0, iSr=0.5, iVr=0.5.
When sRateG≠sMaxRate or iRateG≠iMaxRate,
sHg=120, sSg=0.5, sVg=0.5,
iHg=120, iSg=0.5, iVg=0.5.
When sRateB≠sMaxRate or iRateB≠iMaxRate,
sHb=240, sSb=0.5, sVb=0.5,
iHb=240, iSb=0.5, iVb=0.5.
When sRateC≠sMaxRate or iRateC≠iMaxRate,
sHc=180, sSc=0.5, sVc=0.5,
iHc=180, iSc=0.5, iVc=0.5.
When sRateM≠sMaxRate or iRateM≠iMaxRate,
sHm=300, sSm=0.5, sVm=0.5, iHm=300, iSm=0.5, iVm=0.5.
When sRateY≠sMaxRate or iRateY≠iMaxRate,
sHy=60, sSy=0.5, sVy=0.5,
iHy=60, iSy=0.5, iVy=0.5.

Through this process, only those pixels that are located in the hue-region that has the largest area both in the original image and in the sample image are converted. Accordingly, in the hue-regions other than the largest-area hue-region, S and V values are not converted, and the amount of conversions for H values is reduced.

For example, when the B hue-region occupies the largest area both in the original image and the sample image, the hue correction table of FIG. 7 is modified into a hue correction table, such as shown in the graph of FIG. 9. As shown in the graph of FIG. 9, the representative H values (iHc=180, sHc=180) in the C hue-region adjacent to the B hue-region in the color space and the representative H values (iHb, sHb) in the B hue-region are connected with each other by a straight line, and the representative H values (iHm=300, sHm=300) in the M hue-region adjacent to the B hue-region in the color space and the representative H values (iHb, sHb) in the B hue-region are connected with each other by another straight line.

Therefore, H values are converted in both the C hue-region, where 180<H≦210, and the N hue-region, where 270<H≦300. The amount of conversion increases in values closer to the B hue-region.

In the image correction process according to the embodiment described above, it is possible to select hue-regions where conversion is executed. Further, since a portion of the H values in hue-regions not targeted for conversion but adjacent to hue-regions targeted for conversion in the color space are converted, this method can prevent the occurrence of false contour (tone jump) between converted and non-converted hue-regions.

By performing this representative value resetting process, the multifunction device 10 can partially suspend the correction process for divided hue-regions based on the size of the hue-regions and can reduce the amount of conversions. Accordingly, the user is able to reflect only part of the color tones from the sample image in the color tones of the original image.

As described above, the multifunction device 10 inputs a sample image optically scanned from a document placed on the document-supporting surface (S114), and determines the first characteristic quantity data representing a characteristic of the inputted sample image (S115, S116). The multifunction device 10 also inputs the original image targeted for color conversion from the memory card (S106), and identifies the second characteristic quantity data representing the characteristics of the original image (S107, S108). The multifunction device 10 then performs color conversion on the original image so that the second characteristic quantity data approaches the first characteristic quantity data (S117, S118), and subsequently prints the corrected original image.

With the multifunction device 10 having this configuration, the user can execute color conversion on an original image that is intuitively based on a sample image and requires only sample operations to perform. For example, if the original image includes a building and sky and the user wishes to convert the blue color of the sky to a brilliant ocean blue, the multifunction device 10 can perform this conversion based on a sample image of a brilliant ocean.

Similarly, if the original image shows a person's face and the user wishes to lighten the flesh tones, the multifunction device 10 can convert flesh tones in the original image to lighter flesh tones based on a sample image showing these lighter flesh tones.

Hence, the user can perform desired color conversion simply by scanning a sample image with the image-reading unit 20, and need not have any special knowledge of image processing. Further, since the multifunction device 10 can automatically select hue-regions of an image to be subjected to correction, the multifunction device 10 can convert colors in only hue-regions that are easily perceived, while reducing or eliminating the conversion of less noticeable hue-regions.

Further, since the image-reading unit 20 of the multifunction device 10 is a flatbed scanner having the document cover 21 for covering the document-supporting surface, it is conceivable that the user might initiate color conversion thinking that a document has been placed on the document-supporting surface when in fact a document has not been set. However, the multifunction device 10 determines whether a document is set on the document-supporting surface based on the average brightness value in the pre-scanned image (S303). If the multifunction device 10 determines that a document does not exist on the document-supporting surface (S103: YES), the multifunction device 10 confirms whether the user wishes to cancel the printing operation (S304).

It is also possible that the sample image will have little effect in the color conversion process (effect little change). However, if the multifunction device 10 of the embodiment determines that the amount of change in the original image before and after the color conversion process is less than the threshold value $U_{Thre}$ (S111: NO), then the multifunction device 10 confirms whether the user wishes to cancel the printing operation (S112).

Therefore, the multifunction device 10 can prevent needless printing of images that the user does not need when the user forgets to set the original document or when the document set on the document-supporting surface has little effect on color conversion. Further, by confirming with the user rather than simply canceling the printing operation, the multifunction device 10 can ensure that all images needed by the user are printed.

The multifunction device 10 updates the threshold value $U_{Thre}$ to the amount of change in the original image actually effected by the color conversion process when the user does not cancel the printing operation despite the amount of change being smaller than the threshold value $U_{Thre}$. Accordingly, the multifunction device 10 adjusts the threshold value $U_{Thre}$ to a value preferred by the user as the multifunction device 10 is used. As a result, the multifunction device 10 can automatically print images having an amount of change preferred by the user, without forcing the user to confirm each time.

Further, by using a lower scanning resolution on images used for determining whether or not to cancel the printing operation (S104, S112) than the scanning resolution used in the process for generating the image to be printed (S118), the multifunction device 10 can reduce the required storage capacity and increase processing speed.

While the invention has been described in detail with reference to the embodiment thereof, it would be apparent to those skilled in the art that various changes and modifications may be made therein without departing from the spirit of the invention.

(1) In the above embodiment, the multifunction device 10 determines whether an original document is set on the document-supporting surface and determines the amount of change in the original image before and after the color conversion process based on a low-resolution image obtained in a pre-scan, but the multifunction device 10 may perform these determinations based on an image scanned at the normal resolution instead. This method is effective in the sense that the sample image need not be scanned twice. However, the method of reducing the resolution described in the above-described embodiment is effective for speeding up processing and reducing the required storage capacity.

(2) In the above-described embodiment, image correction is performed when the user does not wish to cancel the printing operation, despite no document being set on the document-supporting surface (no in S104). However, the multifunction device 10 may simply print the original image without performing image correction.

(3) In the above-described embodiment, the multifunction device 10 prompts the user to confirm whether to cancel printing in cases in which the multifunction device 10 determines that a document has not been set and in cases when the multifunction device 10 determines that the magnitude of change in the original image effected by color conversion is insignificant. However, the multifunction device 10 may cancel the printing operation without checking with the user in these cases.

(4) In the above-described embodiment, the multifunction device 10 scans a sample image with the image-reading unit 20, but the present invention is not limited to this configuration. For example, the multifunction device 10 may use an image read from a memory card or an image received from an external source via the communication section 60 as the sample image. Although the problem of the user forgetting to set the original document is eliminated with this configuration, the effects of enabling the user to cancel the printing operation when the color conversion effect is insignificant can still be obtained.

(5) In the embodiment described above, original images to undergo color conversion are inputted from a memory card, but the present invention is not limited to this configuration. For example, images scanned by the image-reading unit 20 or images received from an external source via the communication section 60 may be subjected to color conversion.

(6) In the color conversion process of the embodiment described above, a process is performed to convert pixels in the sample image and original image to HSV parameters prior to the process for determining the first and second characteristic quantity data, but the present invention is not limited to this process. For example, pixels may be converted to other parameters than HSV parameters, such as L*c*h* parameters or RGB parameters.

(7) In the embodiment described above, the second characteristic quantity data is determined after determining the first characteristic quantity data in the color conversion process, but the first characteristic quantity data may be determined after determining the second characteristic quantity data.

(8) In the embodiment described above, the algorithm for determining the first characteristic quantity data is identical to the algorithm for determining the second characteristic quantity data, but different algorithms may be used.

(9) In the embodiment described above, the representative value resetting process is performed to suspend part of the correction process based on the size of hue-regions and to reduce the amount of conversions. However, it is not necessary to perform the representative value resetting process.

(10) In the embodiment described above, a color conversion process is used as an example of the image correction process, but an image correction process other than that described in the embodiment may be performed.

(11) While the amount of conversion for H values in the hue-regions not targeted for conversion can be reduced in the image correction process of the embodiment, the conversion may not be completely eliminated. This is because the H values in hue-regions not targeted for conversion are affected by the representative values in hue-regions targeted for conversion, since linear interpolation is performed using representative values of hue-regions not targeted for conversion, as illustrated in FIG. 9.

Figure 10:
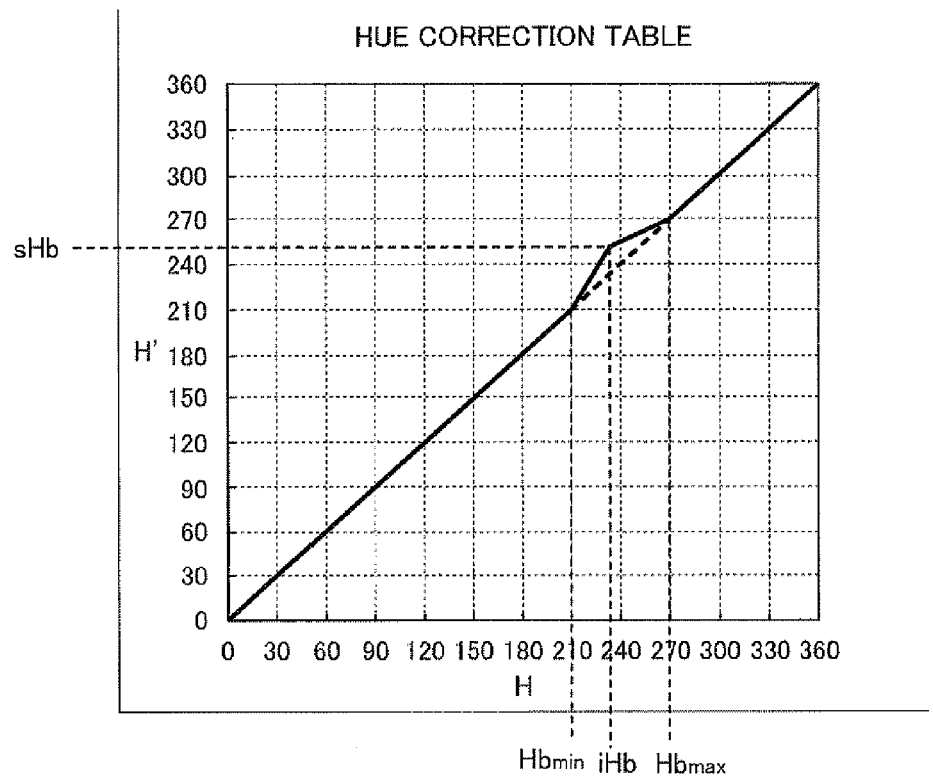
FIG. 10 is a graph for a hue correction table according to a variation of the embodiment.

According to this modification, the hue correction table of FIG. 9 is further modified as shown in the graph in FIG. 10. FIG. 10 shows the hue correction table targeting only the B hue-region for conversion. While only one hue-region is targeted for conversion in FIG. 10, it is also possible to target a plurality of hue-regions.

In FIG. 10, H'=H for values outside the B hue-region, and thus image correction is not performed in these hue-regions. The value of H' in the B hue-region can be found with the following equation, where $Hb_{min}$ is the smallest value of H (210) in the B hue-region and $Hb_{max}$ is the largest value in the B hue-region (270).

When H<iHb, $$H'=Hb\text{min}+(sHb-Hb\text{min})\times(H-Hb\text{min})\div(iHb-Hb\text{min}).$$

When H>iHb, $$H'sHb+(Hb\text{max}-sHb)\times(H-iHb)\div(Hb\text{max}-iHb).$$

Hence, the above equations can be used to convert pixels in only the targeted hue-region. By converting H values only in the hue-region targeted for conversion, the effects of image correction can be enhanced.

Figure 11:
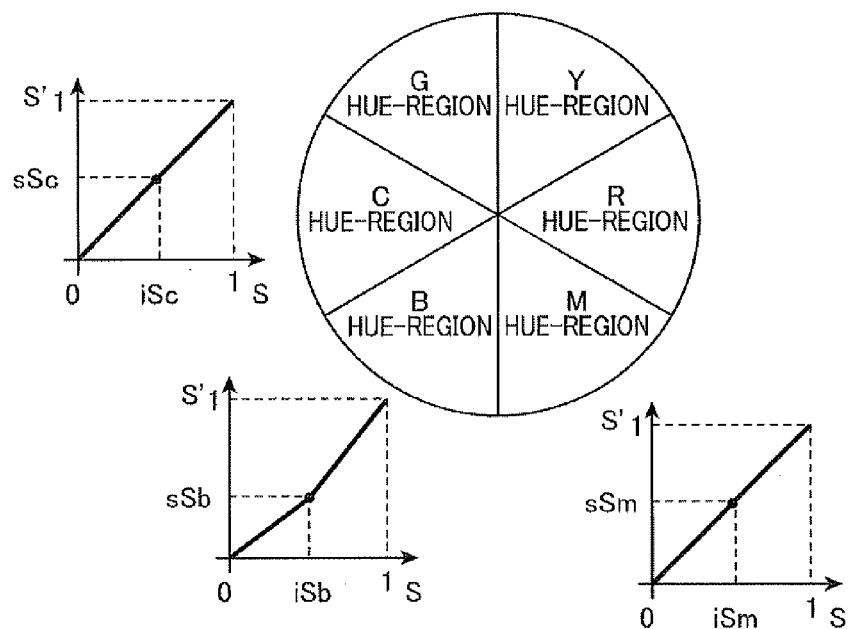
FIG. 11 shows graphs illustrating saturation correction tables for three color hue-regions.

(12) As described above, the S value correction curves for the respective hue-regions (conversion equation 2 or 3) are independent from one another. So, there is a danger of generating false contour (tone jump). More specifically, a table indicating the relationship between S and S' is provided for each hue-region, as shown in FIG. 11, without consideration for the properties of tables for adjacent hue-regions. Similarly, the V value correction curves (conversion equation 4 or 5) for the respective hue-regions are also independent from one another.

Figure 12:
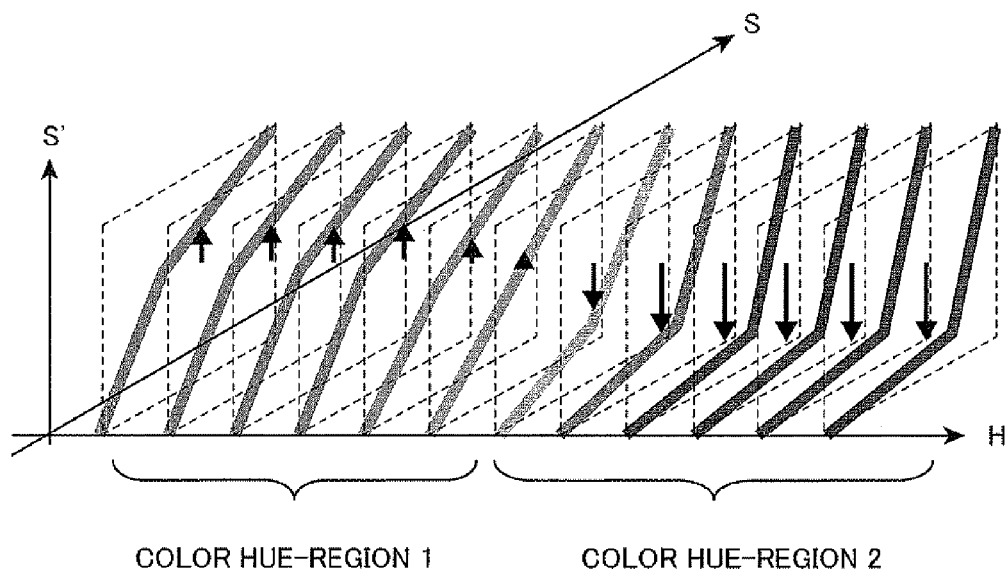
FIG. 12 is an explanatory diagram illustrating changes in a saturation correction curves.

In this modification, tone jump can be prevented by modifying the correction curves in the respective hue-regions so that the correction curves will smoothly change through the hue-regions as shown in FIG. 12.

According to the modification, the image correction process for correcting the hue value and the S value of a pixel is executed in S110 and S118 while modifying the correction curves. This image correction process will be described next in detail with reference to FIGS. 13 and 14. Following explanation is for the case where the hue value of a pixel targeted for conversion falls in the B hue-region and is nearer to the C hue-region than to the M hue-region. However, the process is essentially the same for other cases.

The value S of the pixel targeted for conversion is converted into a modified, converted value S" according to equation 7 below using the following parameters.

H: The hue value for the pixel (see FIGS. 13 and 14)
S: The saturation value for the pixel (see FIG. 13)
$Hb_{mid}$: The middle hue value (240) in a target hue-region (B hue-region in this example), where the hue value H of the pixel falls
$Hb_{mid}$: The middle hue value (180) in another hue-region (C hue-region, in this example) that is adjacent to the target hue-region on a side near the hue coordinate position of the hue value H of the pixel (see FIGS. 13 and 14)

Figure 13:
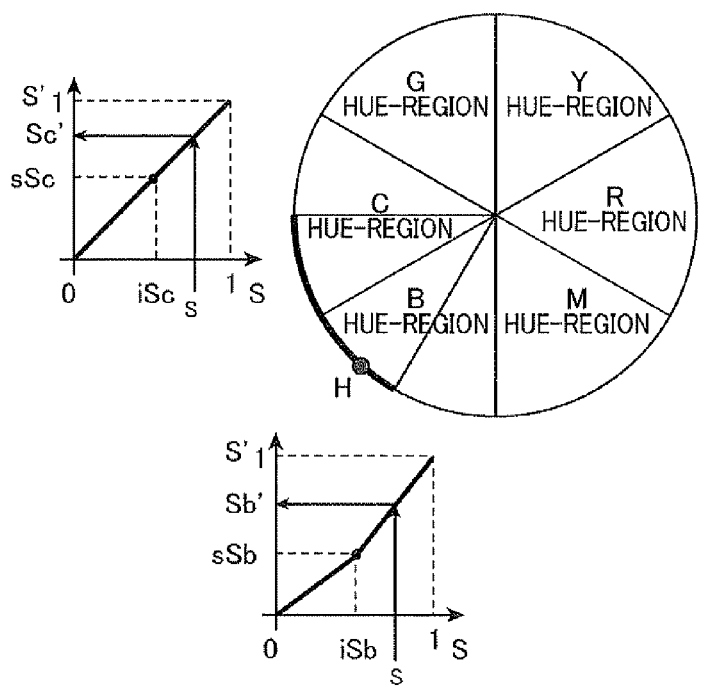
FIG. 13 shows graphs of saturation correction tables for the B and C hue-regions.

Sb': A B-region-dependent converted saturation value for the pixel, which is calculated by using the above-described equation 2 or 3 (the saturation correction table) for the B hue-region based on the saturation value S of the pixel as shown in FIG. 13 (see FIG. 13)

Sc': A C-region-dependent converted saturation value for the pixel, which is calculated by using the above-described equation 2 or 3 (the saturation correction table) for the C hue-region based on the saturation value S of the pixel as shown in FIG. 13 (see FIG. 13)

$$S''=\{(H-Hc_{mid})\times Sb'+(Hb_{mid}-H)\times Sc''\}\div\{(Hb_{mid}-Hc_{mid})\}$$ (Equation 7)

The value V of the pixel targeted for conversion is converted into a modified, converted value V" according to equation 8 below using the following parameters.

H: The hue value for the pixel (see FIGS. 13 and 14)

V: The brightness value for the pixel $Hb_{mid}$: The middle hue value (240) in a target hue-region (B hue-region in this example), where the hue value H of the pixel falls $Hc_{mid}$: The middle hue value (180) in another hue-region (C hue-region, in this example) that is adjacent to the target hue-region on a side near the hue coordinate position of the hue value H of the pixel (see FIGS. 13 and 14)

Vb': A B-region-dependent converted brightness value for the pixel, which is calculated by using the above-described equation 4 or 5 (the brightness correction table) for the B hue-region based on the brightness value V of the pixel Vc': A C-region-dependent converted brightness value for the pixel, which is calculated by using the above-described equation 4 or 5 (the brightness correction table) for the C hue-region based on the brightness value V of the pixel $$V''=\{(H-Hc_{mid})\times Vb'+(Hb_{mid}-H)\times Vc'\}\div\{(Hb_{mid}-Hc_{mid})\}$$ (Equation 8)

The above process is performed when the hue value H of the pixel in question is in the range of $Hc_{mid}$ (180) to $Hb_{mid}$ (240) as shown in FIGS. 13 and 14. By finding the output saturation value (S") and lightness value (V") through the above calculations weighted according to the input hue value H, it is possible to produce smooth correction effects between hues.

(13) Further, while the embodiment describes a multifunction device 10 as the image processor, a data processor such as a personal computer may be used to perform image correction.

What is claimed is:

1. An image processing device comprising:
a first image inputting unit that inputs a first image, the first image inputting unit being configured to input the first image optically read from a document placed in a prescribed reading position;
a second image inputting unit that inputs a second image;
an image processing unit that performs a prescribed process on the second image based on the first image; and
a restriction control unit that is configured to restrict the prescribed process based on information of the first image, the restriction control unit including a judging unit configured to judge whether the document is set in the reading position based on the information of the first image, and a restricting unit configured to restrict the prescribed process based on a result of the judgment, the restriction control unit further comprising a calculating unit configured to calculate a mean brightness in the first image,
wherein the judging unit judges whether the document is set in the reading position when the mean brightness value in the first image is greater than a prescribed value.

2. The image processing device according to claim 1, further comprising an instruction inputting unit that is configured so as to be capable of inputting, by a user of the image processing device, an instruction that the prescribed process is performed, and wherein the restriction control unit cancels the restriction on the prescribed process when the user inputs the instruction via the instruction inputting unit.

3. The image processing device according to claim 1, wherein the image processing unit further comprises a printing unit that performs a printing process to print the second image, and wherein the prescribed process is the printing process.

4. The image processing device according to claim 1, further comprising:
a first characteristic quantity data determining unit that determines first characteristic quantity data expressing a characteristic of the first image; and
a second characteristic quantity data determining unit that determines second characteristic quantity data expressing a characteristic of the second image, and
wherein the image processing unit comprises an image correcting unit that performs an image correction process on the second image based on the first characteristic quantity data and the second characteristic quantity data.

5. The image processing device according to claim 4, wherein the image processing unit further comprises a printing unit that performs a printing process to print the corrected second image, and wherein the prescribed process is the printing process.

6. The image processing device according to claim 4, wherein the prescribed process is the image correction process.

7. The image processing device according to claim 4, wherein the first characteristic quantity data determining unit determines a plurality of first values as the first characteristic quantity data according to a prescribed condition,
the second characteristic quantity data determining unit determines a plurality of second values as the second characteristic quantity data according to the same condition as that for the first characteristic quantity data determining unit, and
the correcting unit performs the image correction process on each of a plurality of pixels constituting the second image based on correction values that are calculated for the pixels based on the plurality of first values and the plurality of second values.

8. The image processing device according to claim 4, wherein the image processing unit further comprises a printing unit that performs a printing process to print the corrected second image, and wherein the prescribed process is the image correction process.

9. The image processing device according to claim 8, wherein the first image inputting unit is configured to input the first image optically read from a document placed in a prescribed reading position, and wherein the restriction control unit comprises:
a judging unit that judges whether the document is set in the reading position based on the information of the first image; and
a restricting unit that restricts the image correction process based on a result of the judgment.

10. An image processing device comprising:
a first image inputting unit that inputs a first image, the first image inputting unit being configured to input the first image optically read from a document placed in a prescribed reading position at a main reading resolution;

a second image inputting unit that inputs a second image;

an image processing unit that performs a prescribed process on the second image based on the first image, the image processing device further comprising a preliminary first image inputting unit that is configured to input the first image optically read from the document at a preliminary reading resolution lower than the main reading resolution; and a restriction control unit that is configured to restrict the prescribed process based on information of the first image, the restriction control unit including a judging unit configured to judge whether the document is set in the reading position based on the information of the first image, and a restricting unit configured to restrict the prescribed process based on a result of the judgment, wherein the judging unit judges whether the document is set in the reading position based on the first image read by the preliminary first image inputting unit.

11. The image processing device according to claim 10, wherein the image processing unit further comprises another image correcting unit that performs another image correction process on the second image based on the first image, wherein the restriction control unit further comprises a comparing unit that compares an amount of change in the second image before and after the another image correction process with a prescribed reference amount, and wherein the restricting unit restricts the prescribed process when the amount of change is smaller than the prescribed reference amount.

12. The image processing device according to claim 11, further comprising an instruction inputting unit that is configured so as to be capable of inputting, by a user of the image processing device, an instruction that the prescribed process is performed, and wherein, when the user inputs the instruction via the instruction inputting unit, the restricting unit cancels the restriction on the prescribed process and updates the prescribed reference amount to the amount of change.

13. An image processing method comprising:

inputting a first image optically read from a document placed in a prescribed reading position;

inputting a second image;

performing a prescribed process on the second image based on the first image;

calculating, as an information of the first image, a mean brightness in the first image; and restricting the prescribed process based on the information of the first image, restricting the prescribed process including judging whether the document is set in the reading position based on the information of the first image, and restricting the prescribed process based on a result of the judgment wherein the document is judged to be set in the reading position when the mean brightness value in the first image is greater than a prescribed value.

14. A computer readable recording medium storing a set of program instructions executable on an image processing device, the program comprising instructions for:

inputting a first image optically read from a document placed in a prescribed reading position;

inputting a second image;

performing a prescribed process on the second image based on the first image;

calculating, as an information of the first image, a mean brightness in the first image; and restricting the prescribed process based on the information of the first image, restricting the prescribed process including judging whether the document is set in the reading position based on the information of the first image, and restricting the prescribed process based on a result of the judgment, wherein the document is judged to be set in the reading position when the mean brightness value in the first image is greater than a prescribed value.

15. An image processing device comprising:

a first image inputting unit that inputs a first image;

a first characteristic quantity data determining unit that determines first characteristic quantity data expressing a characteristic of the first image;

a second image inputting unit that inputs a second image, the second image includes a plurality of pixels, each pixel having a color value;

a second characteristic quantity data determining unit that determines second characteristic quantity data expressing a characteristic of the second image;

an image correcting unit that performs an image correction process on the second image based on the first characteristic quantity data and second characteristic quantity data;

a printing unit that performs a printing process to print the second image corrected by the image correcting unit;

a calculating unit that calculates, for each of the plurality of pixels, a difference between the color value and the corrected color value;

a setting unit that sets, as an amount of change, the maximum difference among all differences calculated by the calculating unit;

a comparing unit that compares the amount of change in the second image before and after the image correction process with a prescribed reference amount; and a restriction control unit that is configured to restrict the printing process when the amount of change is smaller than the prescribed reference amount.

16. The image processing device according to claim 15, wherein the image correcting unit corrects, for each of the plurality of pixels, the color value to a corrected color value.

* * * * *